(12) United States Patent     (10) Patent No.: US 12,615,006 B2

Overturf et al.     (45) Date of Patent: Apr. 28, 2026

---

(54) SOLAR PANEL PROTECTIVE CONTAINER APPARATUS AND SYSTEM

(71) Applicant: OVERTURF INDUSTRIAL DEVELOPMENT, LLC., Washington, DC (US)

(72) Inventors: Michael Charles Overturf, Washington, DC (US); Scott Stanley Stephenson, Salem, CT (US)

(73) Assignee: OVERTURF INDUSTRIAL DEVELOPMENT, LLC, Washington, DC (US)

( * ) Notice: Subject to any disclaimer, the term of this patent is extended or adjusted under 35 U.S.C. 154(b) by 0 days.

(21) Appl. No.: 18/767,107

(22) Filed: Jul. 9, 2024

(65) Prior Publication Data

US 2025/0070710 A1     Feb. 27, 2025

Related U.S. Application Data

(60) Provisional application No. 63/534,167, filed on Aug. 23, 2023.

(51) Int. Cl.
    *H02S 20/32*     (2014.01)
    *H02S 30/20*     (2014.01)

(52) U.S. Cl.
    CPC .............. *H02S 20/32* (2014.12); *H02S 30/20* (2014.12)

(58) Field of Classification Search
None
See application file for complete search history.

(56) References Cited

U.S. PATENT DOCUMENTS

| | | | |
|---|---|---|---|
| 2018/0212087 A1* | 7/2018 | Hingley | H02S 40/38 |
| 2019/0044011 A1* | 2/2019 | Pereira | H01L 31/0475 |
| 2021/0083618 A1* | 3/2021 | Lalane | H02S 30/00 |
| 2023/0128626 A1* | 4/2023 | Bilson | H02S 30/20 |
| | | | 136/244 |

* cited by examiner

*Primary Examiner* — Jayne L Mershon

(74) *Attorney, Agent, or Firm* — Michael L. Greenberg, Esq.; Greenberg & Lieberman, LLC

(57) ABSTRACT

The present disclosure concerns a large surface area solar energy generation apparatus and method that protects the solar system from meteorological or any other ambient threat and restores the solar system to operating condition once the threat has passed. The system is sufficiently large to cover parking lots and other large ground surface structures and offers double the conventional solar exposure surface area per supporting post. The apparatus generates more electricity with single axis and dual axis tracking. The apparatus is pre-assembled in a central production facility to avoid costly onsite construction and installed at the utilization site with minimal effort.

10 Claims, 18 Drawing Sheets

Conventional Flatbed Trailer

SOLAR PANEL PROTECTIVE CONTAINER APPARATUS AND SYSTEM

This application is a continuation patent application of non-provisional patent application No. 63/534,167, filed on Aug. 23, 2023, and priority is claimed thereto.

FIELD OF THE PRESENT INVENTION

The present invention relates to the field of solar power generation substrates and systems, and more specifically relates to a solar panel protective container apparatus and system configured to protect solar panels from damage caused by storms exhibiting high winds and airborne debris. Further, the container apparatus provides rotation/tracking to maximize solar power output as well as facilitating transport flexibility for ease of installation and placement.

BACKGROUND OF THE PRESENT INVENTION

Photovoltaic modules can convert solar energy into electricity through the photovoltaic effect, which is a process by which the energy contained in photons is converted into electrical current. Photovoltaic cell modules have been mounted atop structures designed to shade parking areas while at the same time generating electricity.

These supporting structures may be built using a variety of methods. Most often these are suspended on fixed steel-reinforced structures anchored into the ground on concrete foundations. The mounting platforms for fixed-frame solar panels are fixed steel beams or girders, mounted either flat or at a fixed angle to the sun. These steel reinforcements are designed to hold the flat solar panels in place against potentially high wind forces, typically rated to 140 miles per hour maximum.

The number of photons that strike the surface of a photovoltaic panel are at a maximum if the surface of the panel is at a right angle, or orthogonal, to the sphere of the sun. The farther the panel surface tilts away from the sun the less electricity is produced. It is therefore important to keep at panel as close to the orthogonal angle as possible. Fixed angle systems that are attached flat or at a raised angle to the daily sun produce much less electricity than panels that are adjusted as the sun arcs through the sky.

Some solar mounting systems offer single axis or dual axis tracking, and with that higher energy yields. They do this by reducing the number of solar panels per post and attaching a rotating gimbal to the end of the post that rotates the flat area with the sun. This reduces their wind rating to 120 miles per hour, which will not survive an average Caribbean storm. Such systems are unsuitable for use at or south of the Tropic of Cancer, or any location with a history or expectation of high winds.

In geographic areas of the Earth around the Tropic of Cancer and further south, or any frequent-storm afflicted areas, conventional fixed structures of any kind must be reinforced to wind speeds of at least 140 mph. Conventional solar systems are designed to resist winds to 120 mph. Against the background of increasing wind speeds even 140 mph is not sufficient to prevent panels on any fixed structure from being torn by flying debris. Data from 2015 through 2023 shows that six out of nine named storms in the Caribbean had measured wind gusts in excess of 154 miles per hour.

Different technology solar cells have different mounting requirements. The above considerations apply to rigidly framed Silicon solar panels. Flexible solar cells can be made as a laminate, from Copper Indium Gallium Selenide (CIGS), Perovskite, Organic, or other flexible materials. These solar cells can be laminated on curved or rounded roof structures, such as between the seams of metal roofs. Other flexible or semi-flexible solar panels can be attached to tensioned fabric substrates and suspended in fixed tension methods, like fixed tent canopies. While all these are light weight, the structures they are laminated to are fixed and immovable.

Large surface area fixed structures such as solar canopies reduce the utilization flexibility of that space. The typical ratio of exposed solar panel surface area to the number of steel mounting posts is approximately 650 square feet per post to meet a 140 mph wind resistance rating. Parking lot areas are measured in tens of thousands of square feet, therefore requiring many posts, which drives costs up.

This is frequently a reason why commercial property owners are hesitant to install such structures. Trucks or other large vehicles require at least 17 ft clearance. Installing fixed steel structures or membrane canopy structures to heights in excess of 17 ft further increases cost and wind damage risk, since wind speeds increase with height. This inflexibility inhibits the liberal adoption of solar power generation on functionally used land.

Another significant cost driver for conventional canopy solar systems of all kinds is that they are erected by assembling their constituent parts at the installation site. This drives costs up significantly because of the requirement for large assembly teams, tooling, and transport, which further adds to the lackluster adoption rates of large surface area solar systems.

SUMMARY OF THE PRESENT INVENTION

The solar electricity production method of this invention has been greatly improved relative to the state of the art by reducing the complexity and cost required for deployment of a large solar array, providing improved solar radiation exposure and electrical production of the solar array, and protecting the solar array from strong winds or other meteorological threats.

A Solar Panel Protective Container is disclosed. The invention replaces fixed solar canopies or steel structures with a flexible large surface, stowable Solar Array, that is removed from wind damage risk by stowing it in the Solar Panel Protective Container. The container insulates and protects the solar panels, their electrical cabling, controls, and all related equipment from the flying debris that is common during such high wind episodes. The Solar Array can then be re-deployed once the wind dies down.

The Solar Array and its associated electrical components are constructed assembled and tested at a central manufacturing location, and are then stowed for deployment in the Solar Panel Protective Container, which is shipped to an installation site, such that the effort to install the apparatus is greatly simplified and costs are greatly reduced.

A Solar Array suspension apparatus is disclosed. The solar array is suspended from looped steel suspension cables that are attached at two ends to motor-mounted pulleys. The storage and conveyance mechanisms is suspended in the air with vertical fixture posts. By using very light weight suspension structures and light-weight partially flexible solar panels or lightweight flexible solar fabrics the distance between the vertical fixture posts is such that the ratio of exposed surface area to post is double that of conventional solar canopies, while offering significant higher wind speed tolerance.

A non-locking solar panel z-fold structure is disclosed. The invention solves the environmental exposure problem by affixing rows of non-flexible or partially-flexible solar cells panels with many cells in rows, each of which is attached to another row with non-locking spring hinges that are tensioned towards an open or close bias. Each solar panel row is loosely attached to the suspension cable loop without being fixed to it in such a manner that the rows can slide easily along the directional path of the suspension cable loop.

The leading edge of the solar array is fixed to the suspension cable loop. The ends of the suspension cable loop are fixed to a pulleys in a Suspension Cable Drive Motor System. By rotating the pulleys in either direction, the leading edge pulls or pushes on the attached rows, thereby extending or contracting the entire Solar Array.

Protection of the Solar Array requires that the container opening in the direction of unfolding be equipped with a door. The leading edge of the container is equipped with a proximity sensor. Another proximity sensor is attached to the final position at the opposite end of the extent of the solar array. In the case of the z-folded solar array, when the proximity sensors determine that the solar array is either folding or unfolding, a control mechanism opens the door to allow the array to unfold and closes the door when the entire array is stowed in the container.

A tilting mechanism is disclosed. The tilt mechanism is comprised of rotating beams affixed to the two mounting positions suspended from a Rotating Suspension Shaft that connect the rotating beams to the main suspension posts. The beam on the side of the Solar Panel Protective Container is embedded in the structure of the Container and forms part of the Container Frame and Structural Elements. The beam on the opposite side attached to the opposite Rotating Suspension Shaft forms the Opposing Rotating Crossmember. The elements of the Suspension Cable Drive Motor System are fixed to either side of the respective rotating beam.

The Rotating Suspension Shaft system uses electrically controlled motors to rotate the shaft in small increments on command. The motors are connected to electrical controls that calculate the required angle to maximize the electrical production of the solar panels. The electrical controls then instruct the motors to turn the Rotating Suspension Shaft to the required angle. The invention can therefore tilt the entire Solar Array in its respective embodiment to any desired angle relative to the elevation of the sun. The lightweight nature of this arrangement permits a rotational method via several mechanisms not necessarily restricted to the ones discussed here.

In a second embodiment of the solar array consists of a membrane that consists entirely of solar cells or solar energy conversion material substrate or fabric, where all or substantially all the fabric surface area is photosensitive and produces electricity if exposed to sunlight. The entire solar array is sufficiently flexible so that it can be rolled on a freely rotating drum that is mounted inside the Solar Panel Protective Container. In this embodiment, the membrane is affixed to the leading edge and loose suspension mechanism as described above. In the same manner, the rotating cable loop of the Suspension Cable Drive Motor System stows and expands the solar array by turning in the respective directions.

In a third embodiment of the invention, the vertical fixture posts may have a variety of shapes that suspend the solar array suspension cables at a functional height and required distance from each other. The vertical fixture posts may be telescoping structures or other variable height structures that may be synchronized to lift or lower the Solar Panel Protective Container to any desired height. The rotating beams would be attached to fixed mounting platforms that sit atop independent adjustable height structures that can be used to adjust the array to a seasonal solar azimuth. Among a variety of purposes, the invention implements a two-axis solar tracking mechanism that further improves the performance of the solar panels by adjusting the angle of the entire structure for seasonal solar azimuth changes.

In a fourth embodiment of the deployment of the rotating solar array the Solar Panel Protective Container is affixed to a telescoping structure that is itself mounted to a vehicle platform. In this embodiment the protective container is paired with an opposing suspension beam that is oriented in the opposing direction immediately behind the container and mounted to the same rotating shaft. In this way, the solar container may be moved to any location, elevated to a required height, and multiple such embodiments of this invention may be chained together to form mobile, on demand large scale solar energy production.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

The following brief and detailed descriptions of the drawings are provided to explain possible embodiments of the present invention but are not provided to limit the scope of the present invention as expressed herein this summary section.

BRIEF DESCRIPTION OF DRAWINGS OF THE PRESENT INVENTION

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION OF THE PRESENT INVENTION

Figure 1:
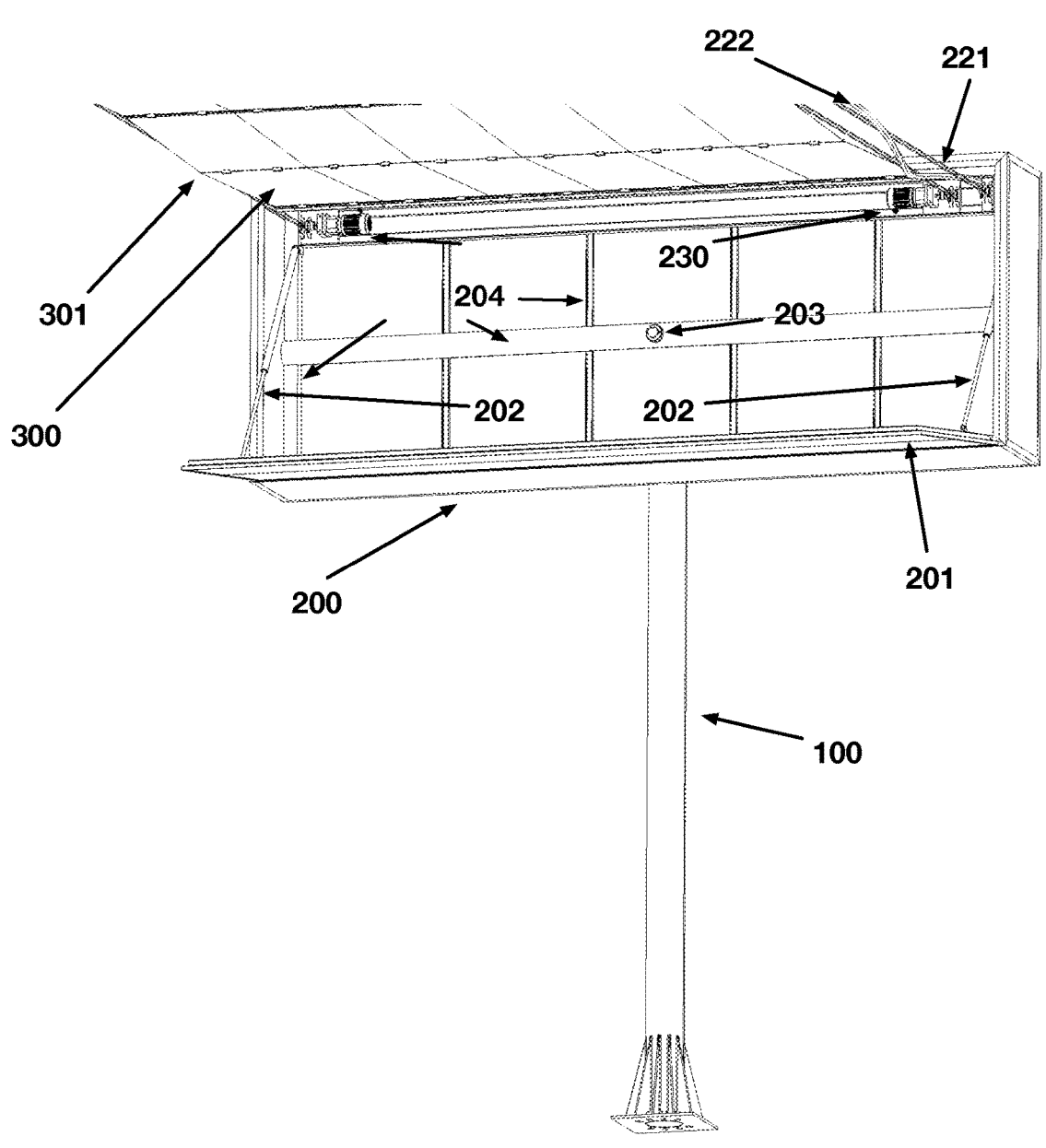
FIG. 1 depicts the structure and elements of the front view of Solar Panel Protective Container in accordance with various embodiments, shown here with the Solar Panel Protective Container mounted on a Main Fixed Post component as one of the embodiments.

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to affect such feature, structure, or characteristic in connection with other embodiments whether or not explicitly described.

The embodiments disclosed are only examples of the many possible advantageous uses and implementations of the innovations presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments include an apparatus comprised of a solar array and solar array suspension system used for generation of electricity that may be regulated and supplied to a consumer of such electricity. Such an electricity consumer may be one or more buildings with multiple electricity consuming devices, a commercial operator of electrically powered machinery, or similar such electricity users that may use large quantities of electricity.

Figure 2:
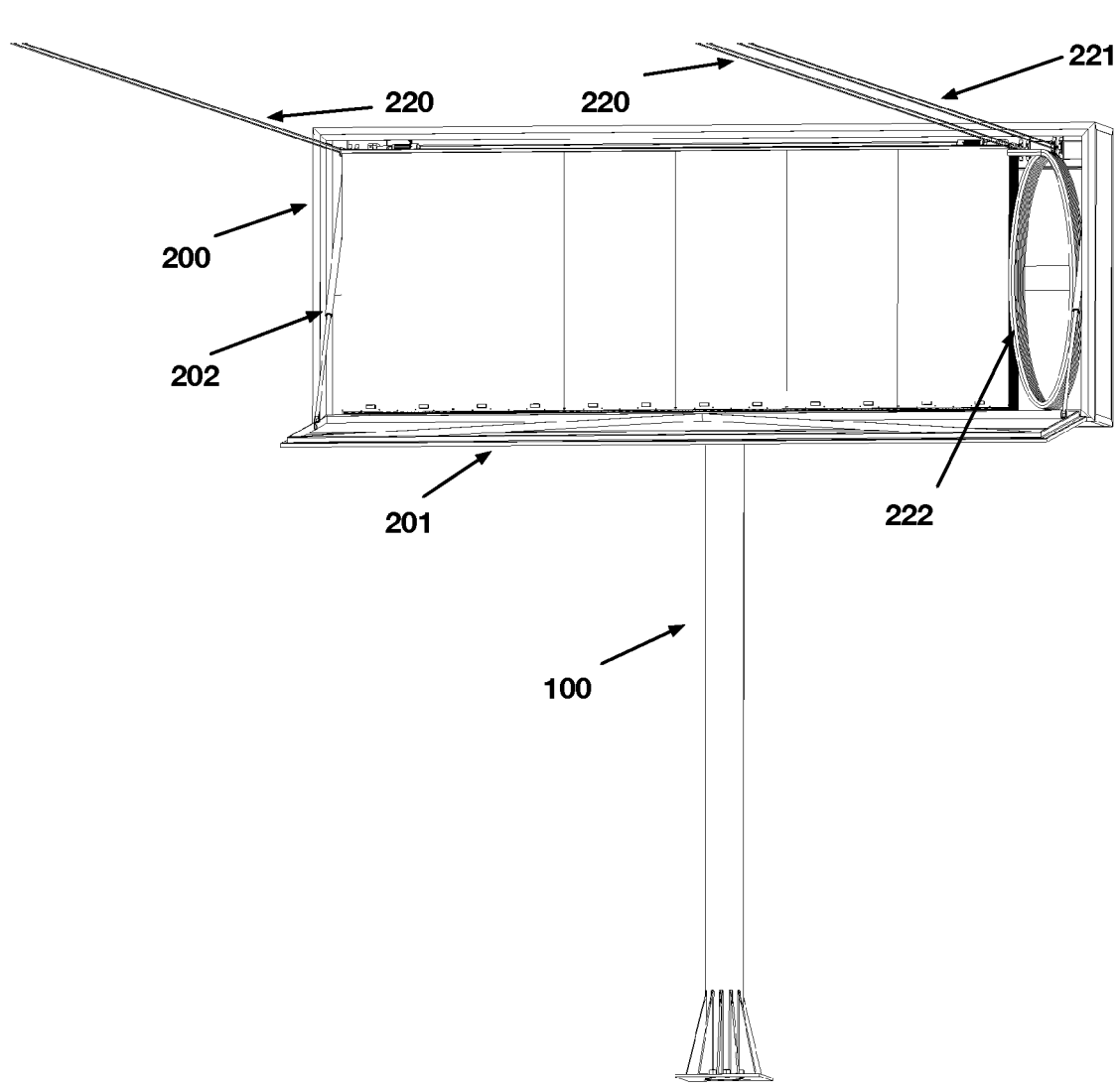
FIG. 2 depicts the structure and elements of the front of the Solar Panel Protective Container in accordance with various embodiments, shown here with the Solar Array stowed, door open, and the Direct Current or Alternating Current Electrical Cable coiled in the Container.
Figure 3:
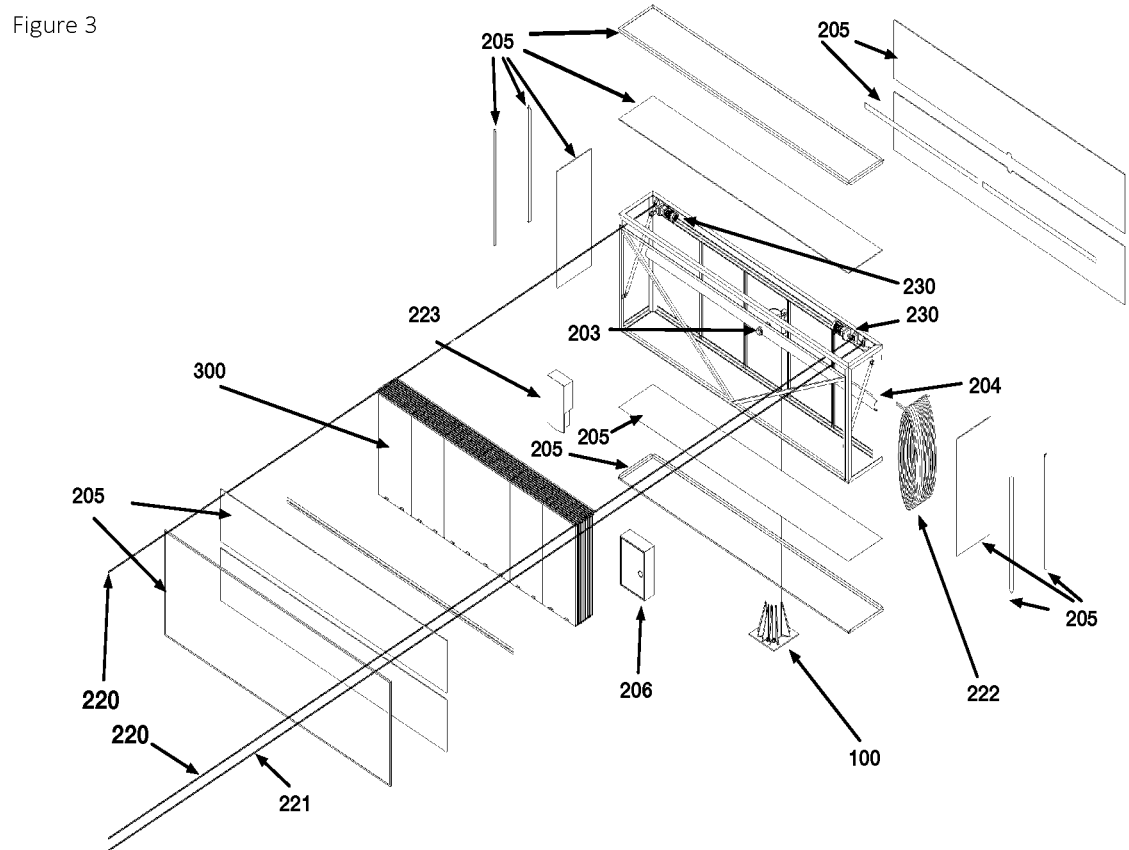
FIG. 3 depicts the structure and elements of the front of the Solar Panel Protective Container in accordance with various embodiments, shown as a parts explosion diagram with the Solar Array stowed, as well as the various components found in inside the Solar Panel Protective Container.
Figure 5:
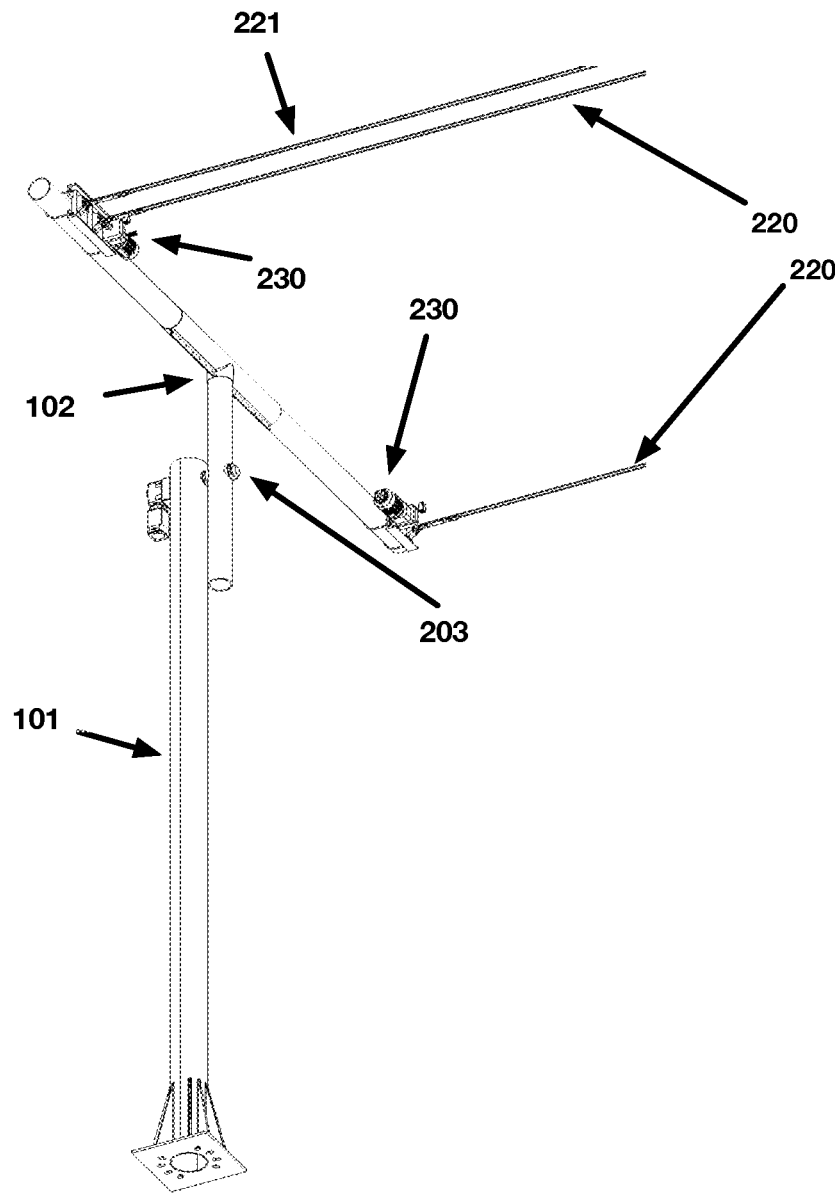
FIG. 5 depicts the structure and elements of the Rotating Crossmember in accordance with various embodiments, shown here attached to the Opposing Fixed Post component with the Rotating Suspension Shaft as one of the embodiments.

The apparatus is comprised of a Solar Array (300), each having at many solar cells, which is suspended above the ground by a Solar Array suspension system that consists at a minimum of a Solar Panel Protective Container (200) and its associated components shown in FIG. 1, FIG. 2, and FIG. 3, the Opposing Rotating Crossmember (102) and its associated components shown in FIG. 5, one or more Tensioned Suspension Cable (220) and the Electrical Cable Suspension (221), as shown FIG. 2 and other figures.

The primary purpose of the Opposing Rotating Crossmember (102) is to connect and keep at a certain tensional force multiple Tensioned Suspension Cables (220), as well as supporting the Electrical Cable Suspension (221).

The elevation mounting mechanism for the Solar Array suspension system varies by embodiment and can be fixed height or variable height.

Figure 9:
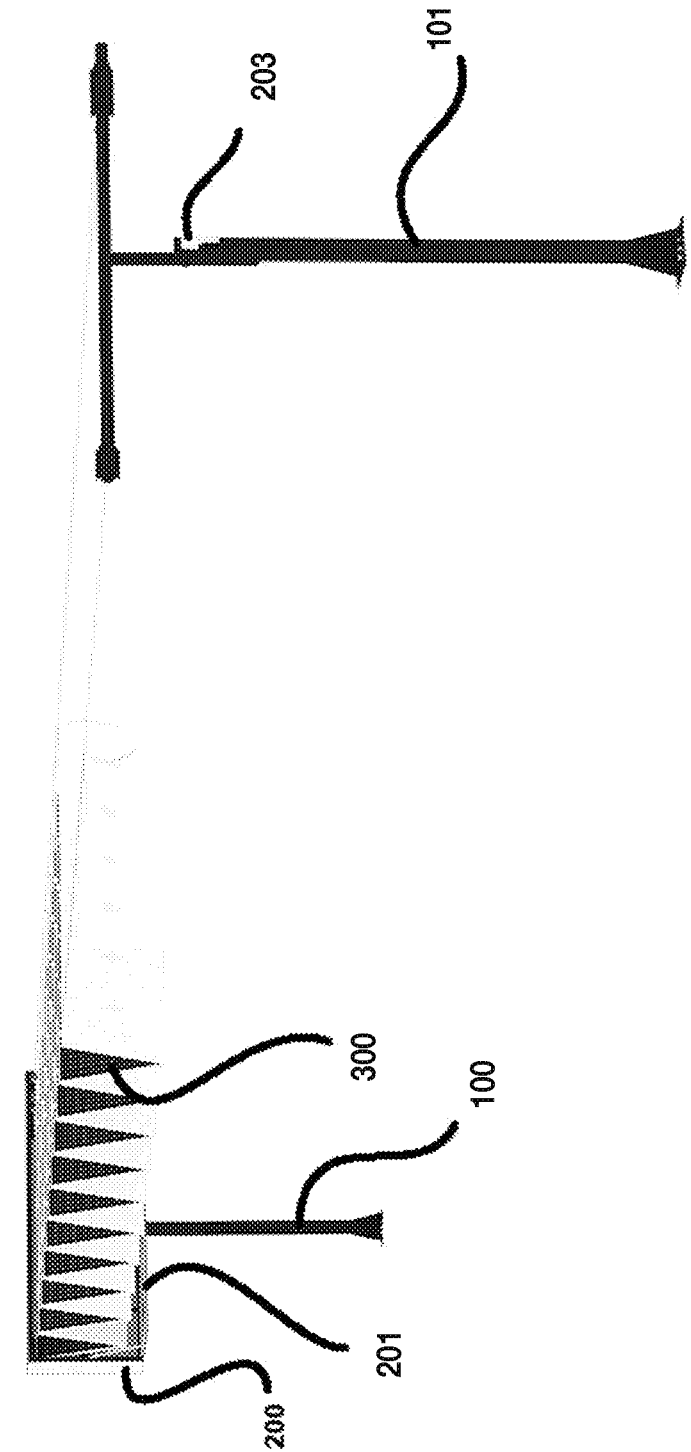
FIG. 9 depicts the integrated invention with a Solar Array either folding or unfolding at zero-degree tilt with the Solar Panel Protective Container Door open, in the embodiment of a z-fold Solar Array.
Figure 13:
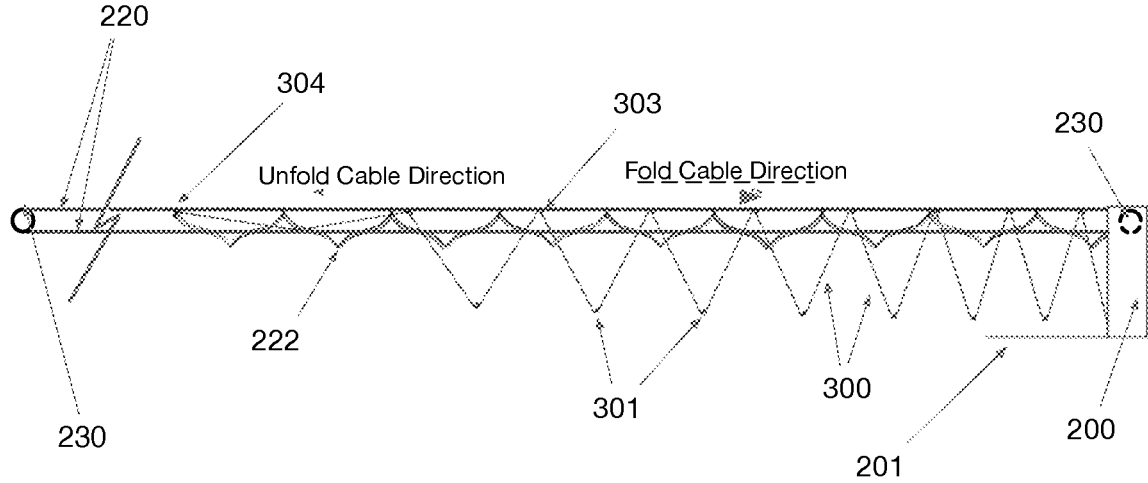
FIG. 13 depicts in an elevation view the structure and elements of the Solar Array suspension in accordance with various embodiments along with the embodiment of the z-fold Solar Array.
Figure 14:
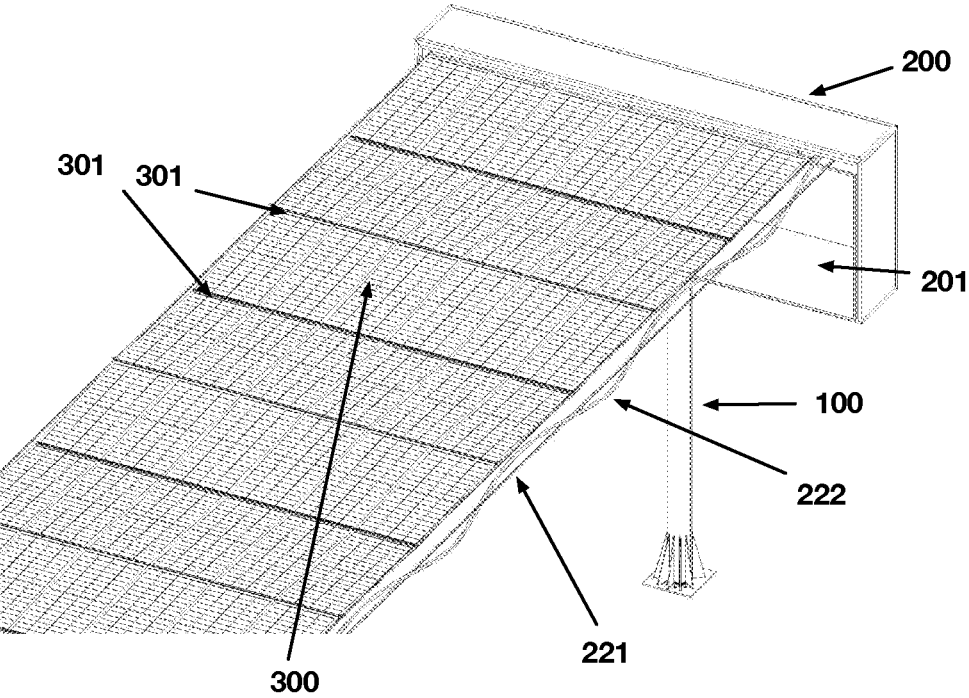
FIG. 14 depicts an isometric view of the various elements in accordance with various embodiment of the z-fold Solar Array.

In one embodiment, the Solar Array (300) may consist of semi-flexible solar panels which consist of many solar cells that cannot be bent beyond a certain degree. The Solar Array (300) is composed of many rows of solar panels. The number of rows is arbitrary but constrained by the force the Tensions Suspension Cable (220) exerts on the Suspension Cable Drive Motor System (230), the Opposing Rotating Crossmember (102), and the Container Frame and Structural Elements (204). Each row in the Solar Array (300) consists of multiple solar panels, a fabric or lightweight panel substrate, and Solar Array Suspension Rings (303) that loosely hang each row to the Tensions Suspension Cable (220), as shown in FIG. 13 and other figures of the embodiments. In one embodiment, the solar panels are connected to each other in a natural z-fold arrangement with Solar Array Panel Hinges (302) that are alternated to point up or down for each row, such that they force arrangement or the rows into the z-fold shape without very little force applied to them, as depicted in FIG. 9, FIG. 13, and FIG. 14.

Figure 15:
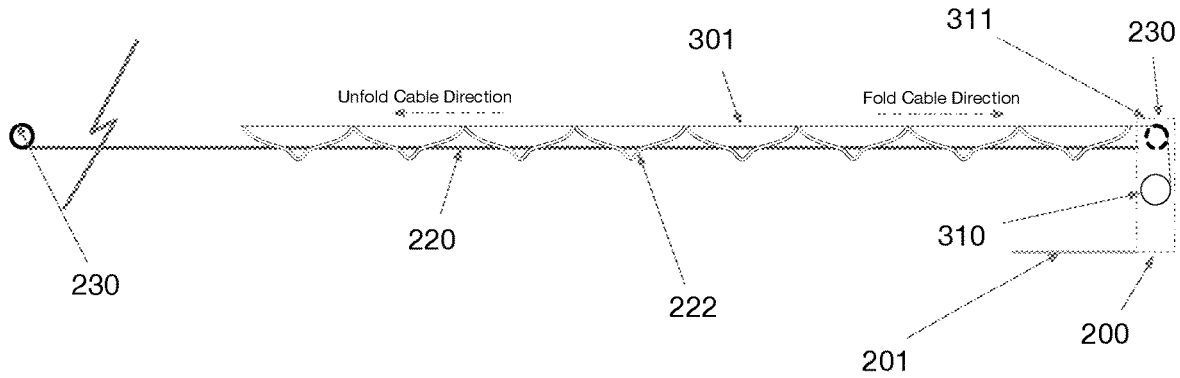
FIG. 15 depicts in an elevation view the structure and elements of the Solar Array suspension in accordance with various embodiments along with the embodiment of the Foil or Membrane Solar Array.
Figure 16:
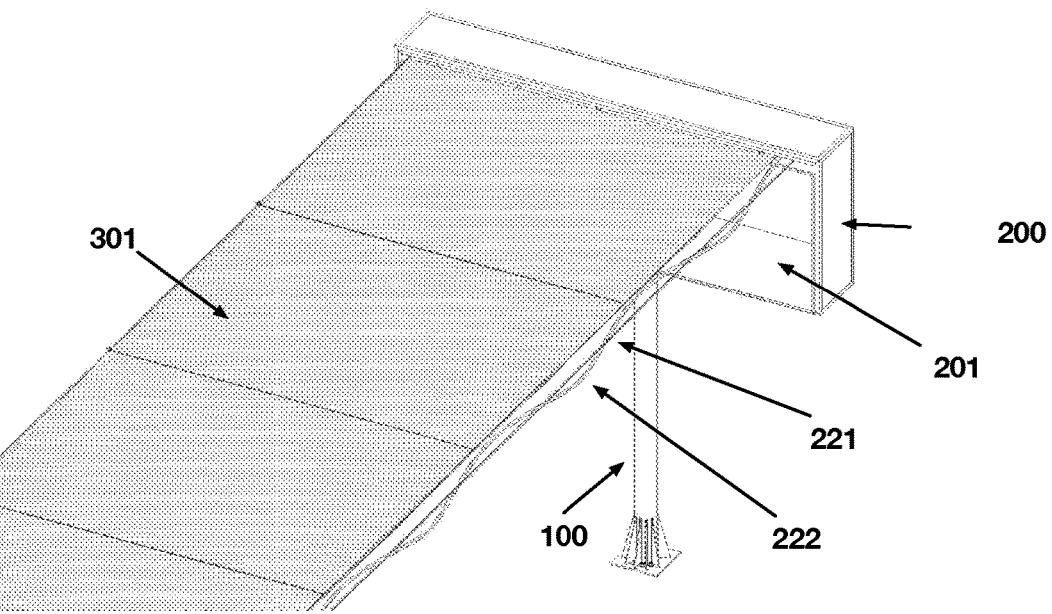
FIG. 16 depicts in an isometric view of the elements of the invention in accordance with various embodiment of the Foil or Membrane Solar Array.

In another embodiment the Solar Array (300) may consist of a photosensitive fabric or foil that extends the width of the Solar Panel Protective Container that is rolled up on a mounted Solar Membrane or Foil Rollup Drum (310), as shown in FIG. 15 and FIG. 16. In this embodiment the Solar Array is folded by turning the Solar Membrane or Foil Rollup Drum in a synchronized fashion with the Suspension Cable Drive Motor system, where the leading edge of the Solar Membrane or Foil Rollup Drum (310) has a fixed attachment to the Tensioned Suspension Cable, as shown in FIG. 15.

Figure 8:
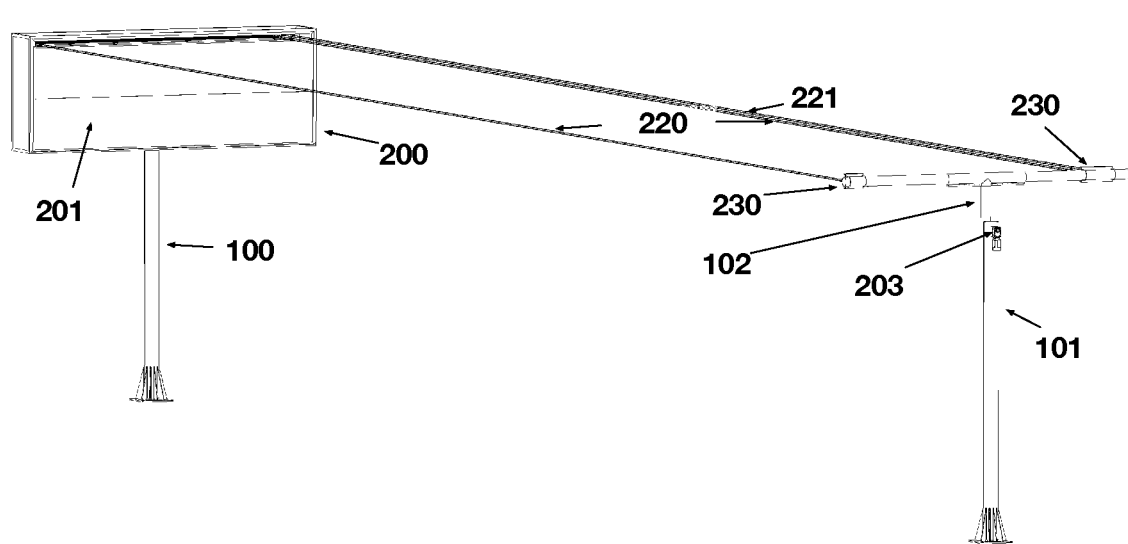
FIG. 8 depicts the integrated invention with Main Fixed Post and the attached Solar Panel Protective Container connected to the Rotating Crossmember with tensioned suspension cables in accordance with various embodiments, and the Solar Array stowed inside the attached Solar Panel Protective Container.

The apparatus is readied for wind or other potential harm situations by stowing the Solar Array (300) inside the Solar Panel Protective Container in manner as shown in FIG. 2, and shown in a storm-readied state in FIG. 8. When the Solar Array (300) is stowed, it necessarily does not produce any electricity as the solar cells are not exposed to solar radiation.

Figure 6:
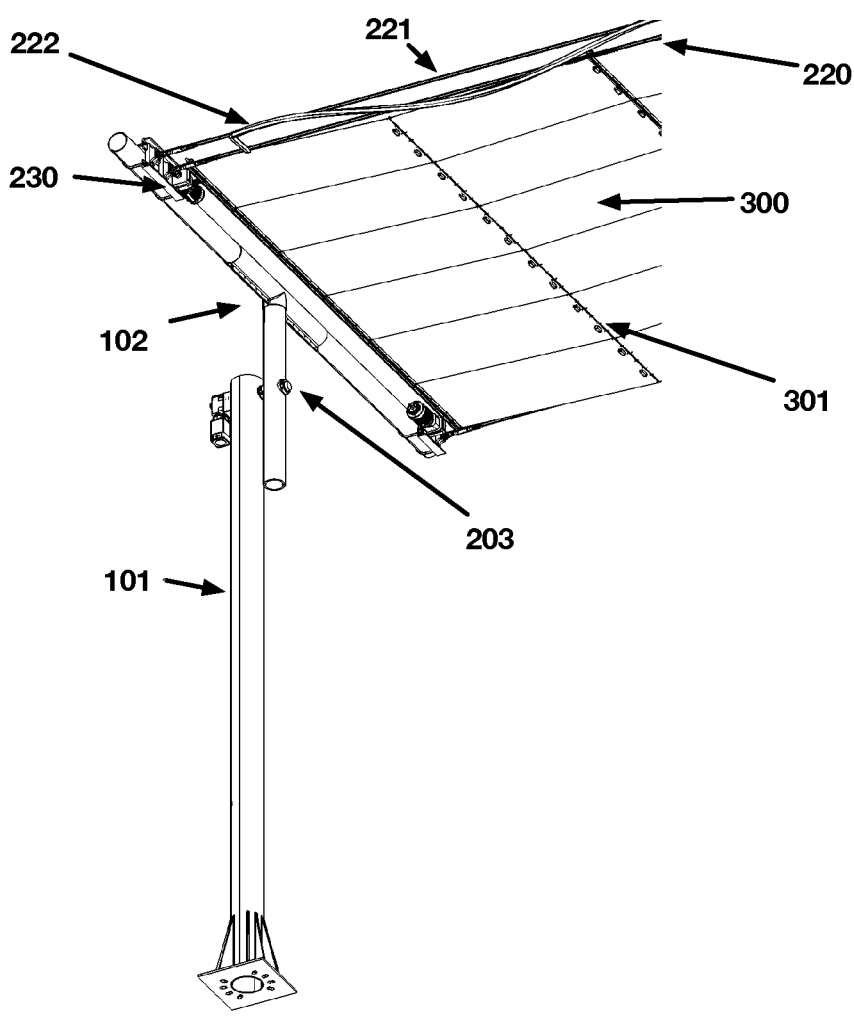
FIG. 6 depicts the structure and elements of the Rotating Crossmember in accordance with various embodiments of the invention, shown here with an unfolded Solar Array as one of the embodiments.

Stowing and expanding the Solar Array (300) is accomplished by turning on one or more motors in the Suspension Cable Drive Motor System (230) mounted in both the Solar Panel Protective Container, as shown in FIG. 1, as well as on the Opposing Rotating Crossmember (102), as shown in FIG. 5 and FIG. 6. The pulleys are turned towards the right in FIG. 5 and FIG. 6 to stow the Solar Array in the Solar Panel Protective Container. The pulleys are turned to the left to expand or unfold the Solar Array out from the Solar Panel Protective Container, as shown in FIG. 5 and FIG. 6 for the different embodiments.

FIG. 1 shows the basic component structure of a Solar Panel Protective Container (200) as viewed from the outside; FIG. 3 shows an explosion diagram of the components of the Solar Panel Protective Container (200), which consists of a frame of sufficient strength to withstand required wind pressures, support its weight, the weight of the Solar Array (300), the Solar Inverter (223), and the full length of the Direct Current or Alternative Current Electrical Cable (222). The Solar Panel Protective Container (200) is covered with a high impact resistive Container Shell (205) that protects its contents from impact from flying debris.

Figure 23:
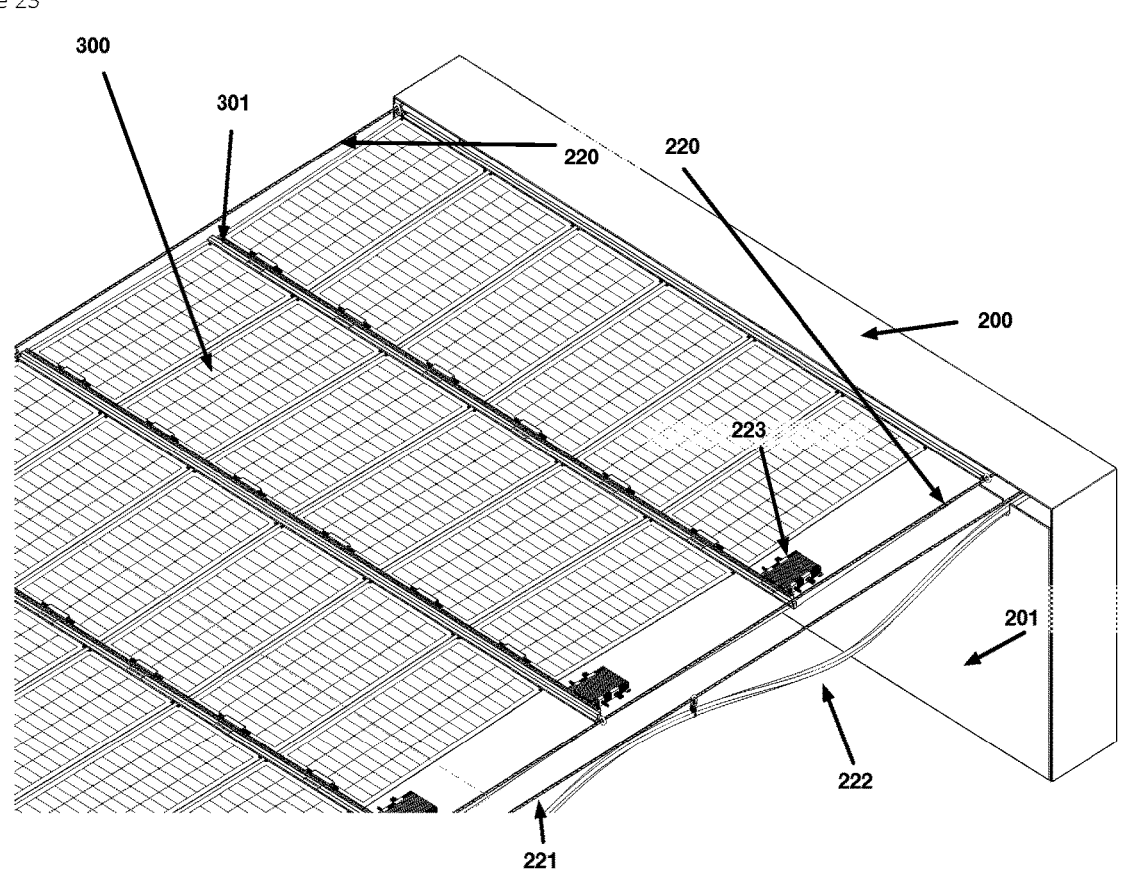
FIG. 23 depicts an isometric view of the various elements in accordance with various embodiment of the z-fold Solar Array, with added microinverters that convert the DC current of each panel row into AC Current for subsequent use by consumers.

In another embodiment of the invention, the central Solar Inverter (223) in the Solar Panel Protective Container (200) is replaced with many Solar Inverters (223) suspended on the Solar Array (300) itself, as shown in FIG. 23.

The Solar Panel Protective Container (200) as shown is FIG. 1, 2, 3 and other figures is generally depicted as a rectangular structure. In other embodiments not necessarily described here, the shape of the Solar Panel Protective Container (200) may be any shape, such as a sphere, torus, or polygon or any geometric shape that is able to fulfill the functional requirements described herein.

The embodiment of the invention as shown in FIG. 3 is conceived such that it contains all components required to produce solar energy at an installation site, with the exception of the vertical support elements. A complete solar energy generation system can be completely configured at a location site from a Main Fixed Post (100) or Variable Height Post Main Post (103), an Opposing Rotating Crossmember (102) with it's attendant Suspension Cable Drive Motor System (230), an Opposing Fixed Post (101) or Variable Height Opposing Post (104), and a complete Solar Panel Protective Container (200). These systems may be centrally assembled at a factor, then shipped to the installation location.

Installers pre-configure the installation of the posts if they are to be anchored to the ground, as is the case for the Main Fixed Post (100) and Opposing Fixed Post (101). Once these are firmly attached, the Opposing Rotating Crossmember (102) is lifted up and attached via the pre-configured Rotating Suspension Shaft (203). Then the Solar Panel Protective Container (200) is lifted up at attached to the Main Fixed Post (100) with its Rotating Suspension Shaft (203).

The installers then open the Solar Panel Protective Container Door and extract the Tensioned Suspension Cable (220) and the Electrical Cable Suspension (221) and extend those over the respective attachment points of the Suspension Cable Drive Motor System (230). This concludes the installation process, which is thereby shortened from a conventional installation effort by an order of magnitude.

Figure 4:
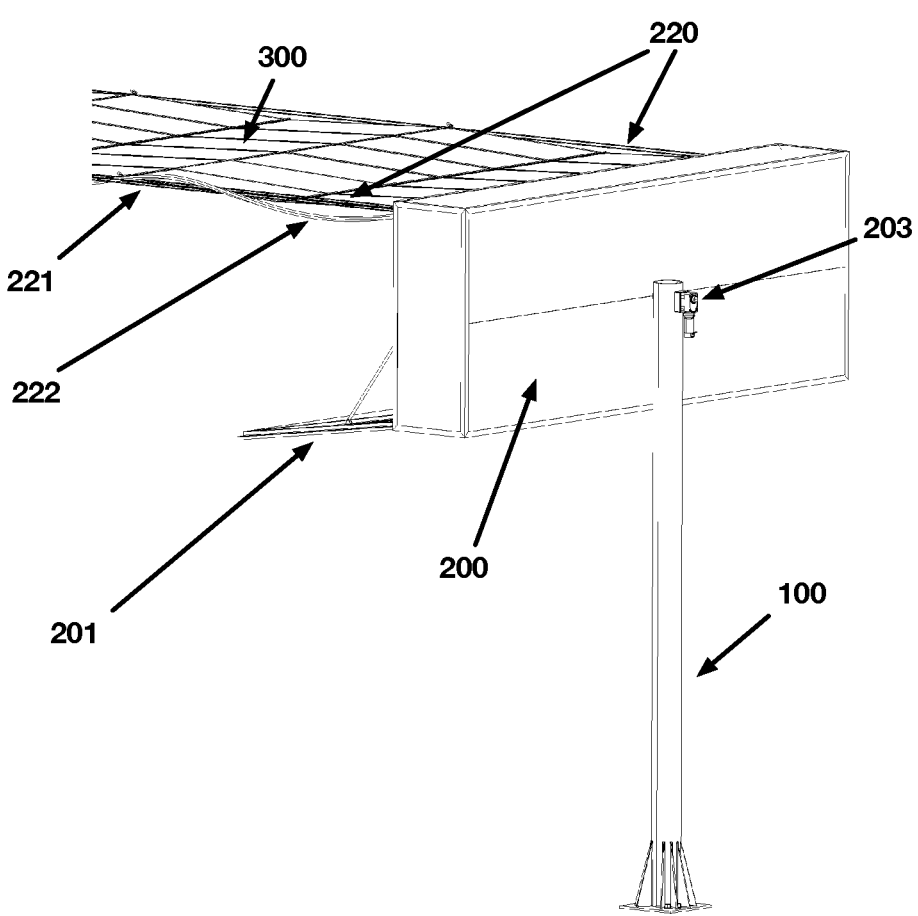
FIG. 4 depicts the structure and elements of the back view of the Solar Panel Protective Container in accordance with various embodiments, shown here with the Main Fixed Post component attached to the Solar Panel Protective Container with a Rotating Suspension Shaft as one of the embodiments.

The Solar Array (300) is suspended from one or more Tensioned Suspension Cables (220) that is attached at one end to a motorized pulley part of the a Suspension Cable Drive Motor System (230), as shown in FIG. 1 and FIG. 2. The other end of the Tensioned Suspension Cable (220) is attached to the Opposing Rotating Crossmember (102) using the different instance of the Suspension Cable Drive Motor System (230), as shown in FIG. 5 and FIG. 13. The Tensioned Suspension Cable (220) is a loop that is fitted over a pulley of the Suspension Cable Drive Motor System (230) at either end, as show in FIG. 13 and FIG. 15. The Tensioned Suspension Cable (220) is tightened to support the weight of the Solar Array (300) when it is expanded or stowed. There are typically two Tensioned Suspension Cable (220) to attached to either side of the Solar Array (300), as shown in FIG. 2, FIG. 2, FIG. 4 and FIG. 5, and other figures of other embodiments.

In all embodiments electricity must be collected from the solar cells along the entire Solar Array (300) in one or more cables, referred to as Direct Current or Alternative Current Electrical Cable (222). These cables are arranged in such a fashion that they extend and retract together with the Solar Array (300) by loosely suspending the Direct Current or Alternative Current Electrical Cable (222) from the Electrical Cable Suspension (221) as shown in FIG. 9, FIG. 1, and FIG. 2 and other figures. When the Solar Array (300) is stowed in the Solar Panel Protective Container (200), the Direct Current or Alternative Current Electrical Cable (222) is coiled into stowed position as shown in FIG. 2.

Solar Panel Protective Container (200) may be attached to a variety of structures in the different embodiments, such as a Main Fixed Post (100), a Variable Height Main Post (103), or a Variable Height Combined Post (106) for different purposes. The suspension for both the Solar Panel Protective Container (200) and the Opposing Rotating Crossmember (102) is provided using a Rotating Suspension Shaft (203), shown in FIG. 1, FIG. 7, and various other Figures of the embodiments, whereby the attachment of the of the Solar Panel Protective Container is fixed mounted to the Rotating Suspension Shaft (203), which is attached to the different embodiments with a bearing and motor structure, as shown in FIG. 7.

Figure 11:
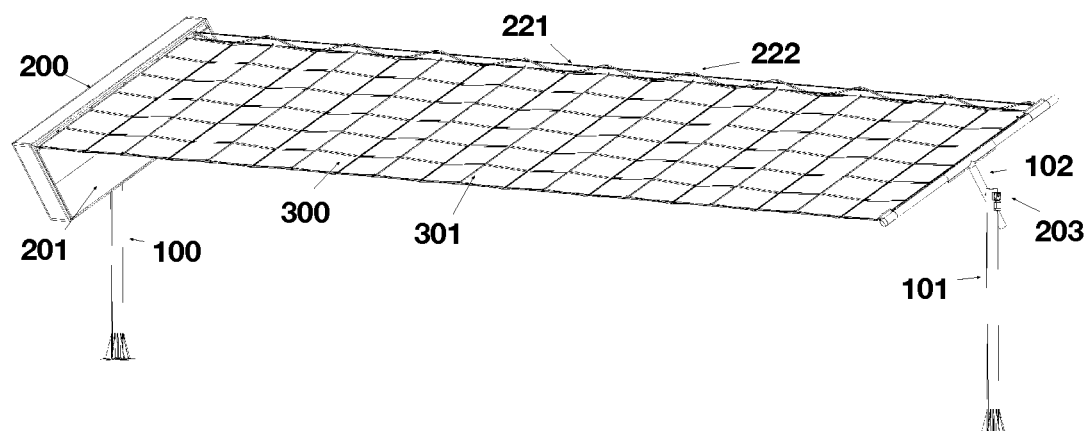
FIG. 11 depicts the integrated system in accordance with various embodiments of the invention with a fully unfolded Solar Array and at a 30 degree tilt.
Figure 12:
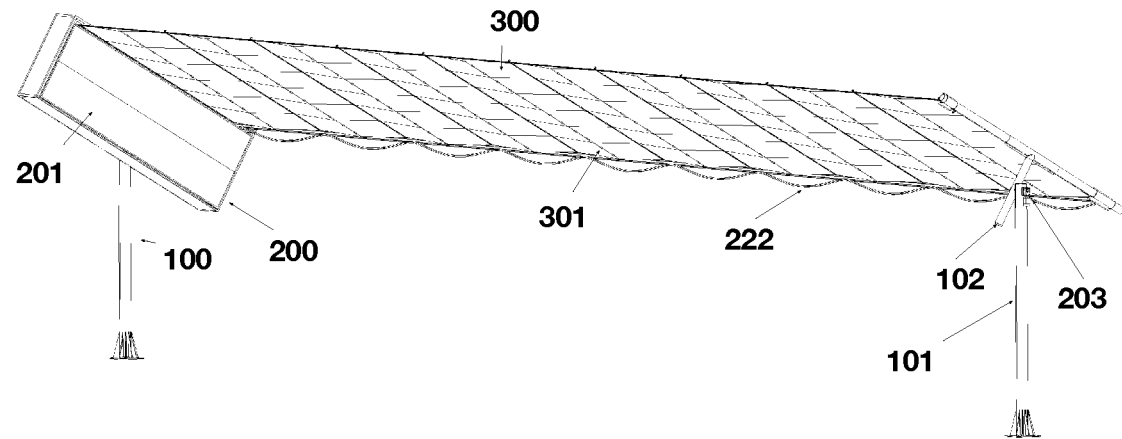
FIG. 12 depicts the depicts the integrated system in accordance with various embodiments of the invention with a fully unfolded Solar Array and at a 30 degree tilt in the opposite direction of the tilt in FIG. 11.
Figure 22:
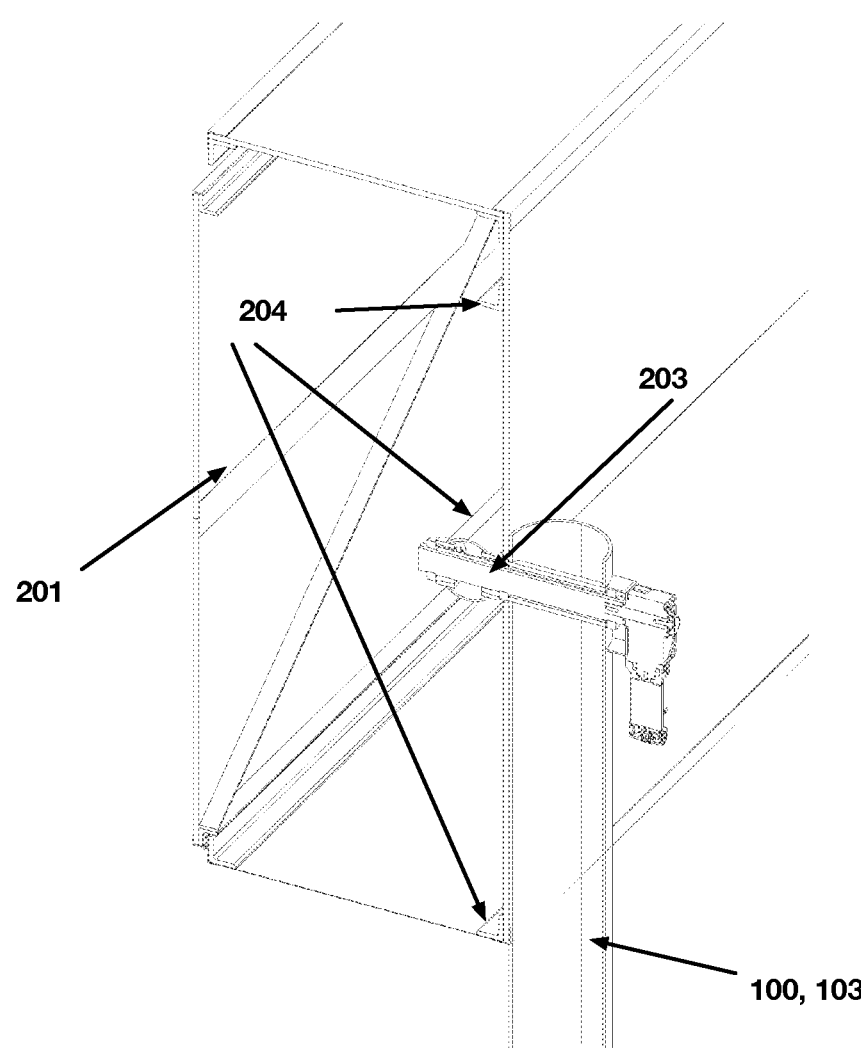
FIG. 22 depicts a cross section of the structure and components of the Rotating Suspension Shaft.

This mechanism provides control over the degree of tilt of the container, as shown in FIGS. 11 and 12, by sending a simultaneous command to the motors attached to the Rotating Suspension Shaft (203) shown in FIG. 6 and FIG. 22. The exact tilt angle of the array is in correspondence to the momentary elevation of the sun, thereby significantly increasing electrical production if compared to fixed flat or fixed tilted solar arrays.

Figure 7:
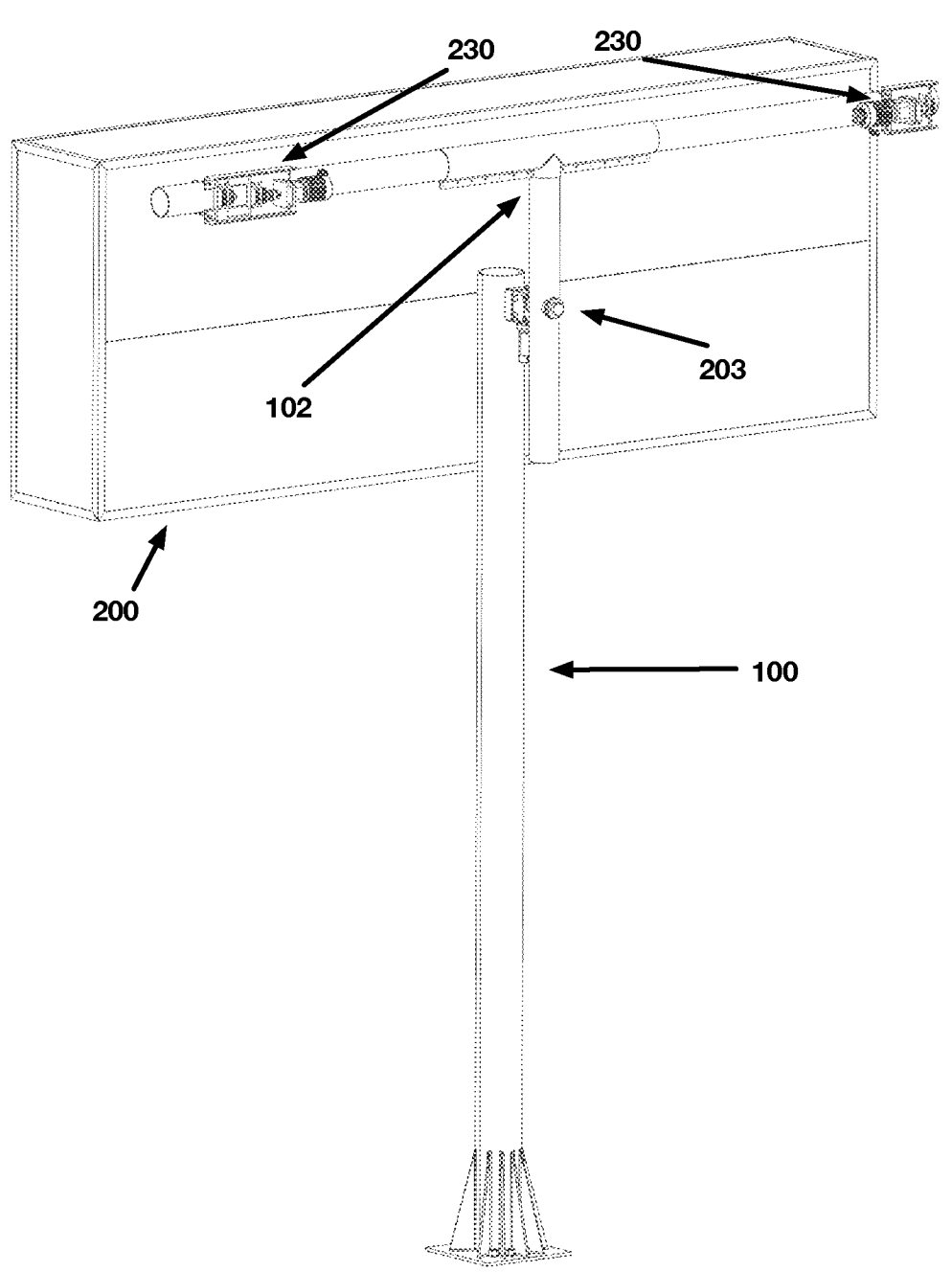
FIG. 7 depicts the structure and elements of a combination of both the Rotating Crossmember and Solar Panel Protective Container attached via a Rotating Suspension shaft to the same fixed post, as one of the embodiments.

The apparatus can be configured to string several instances end-to-end using a common Fixed Combined Post (105) as shown in FIG. 7. In another embodiment, a Variable Height Combined Post (106) serves a similar purposes of end-to-end Solar Array configurations, shown in FIG. 20. Both the Fixed Combined Post (105) and the Variable Height Combined Post (106) each feature a Solar Panel Protective Container (100) with all is attendant system and an Opposing Rotating Crossmember attached to the same elevation mechanism with a common Rotating Suspension Shaft (203) with its attendant components. This structural arrangement ensures that two Solar Arrays can be suspended with three posts, which further reduces cost. Long series of such Solar Arrays of count N will be suspended by N+1 posts.

The Solar Panel Protective Container (200) is fitted with a door, the Solar Panel Protective Container Door (301), that protects the stowed Solar Array (300) from flying debris during high winds when it is closed. The primary purposed of the Solar Panel Protective Container Door (301) is to afford maintenance access to the internal components of the Solar Panel Protective Container (200).

Figure 10:
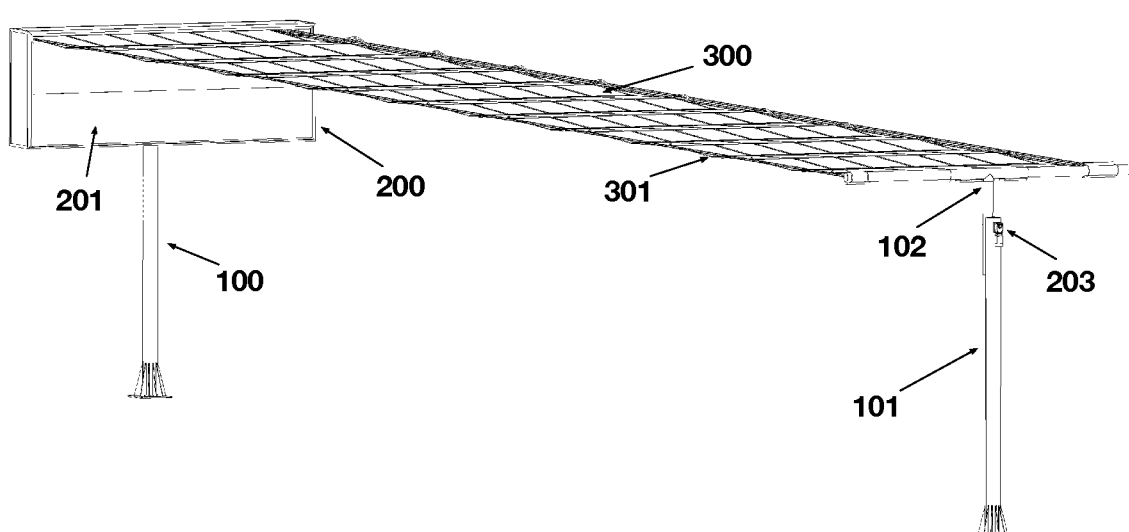
FIG. 10 depicts the integrated system in accordance with various embodiments of the invention, with a fully unfolded Solar Array and at zero degree tilt.

In some embodiments of the invention, the Solar Panel Protective Container Door (301) opens during unfolding of the Solar Array (300) as shown in FIG. 9 and closes after the Solar Array (300) is unfolded, as shown in FIG. 10. Other embodiments of the invention do not require the Solar Panel Protective Container Door (301) to open or close during Solar Array folding or unfolding, as is shown in the embodiment of FIG. 15.

The Solar Panel Protective Container Door (201) is hinged at the bottom or may be designed as two folding halves hinged on the side in different embodiments, as required. The Solar Panel Protective Container Door (201) is opened or closed using one or more Container Door Actuator (202), depicted in FIG. 1 and FIG. 2 and other figures.

Solar cells in various embodiments typically produce direct current (DC) electricity. In most solar energy systems this DC form is converted to alternative current (AC) using an DC to AC inverter. DC Inverters may be very small and connect to 1 to 6 panels, called microinverters, or they may be large and connect to hundreds of panels using multiple strings, a set of solar cells connected in series. An embodiment of the invention may use microinverters that are attached to the Solar Array, as shown in FIG. 23. The invention may use either method of conversion of DC to AC electricity conversion.

While the tilting of the apparatus provides an optimized exposure of the Solar Array to the daily elevation of the sun, the tilt of the earth's axis causes a seasonal and cyclical shift of the solar azimuth, where the north-south position of the sun changes. To continue to offer improved energy production, the entire Solar Array can be lifted on one side to offer improved solar radiation exposure.

Figure 17:
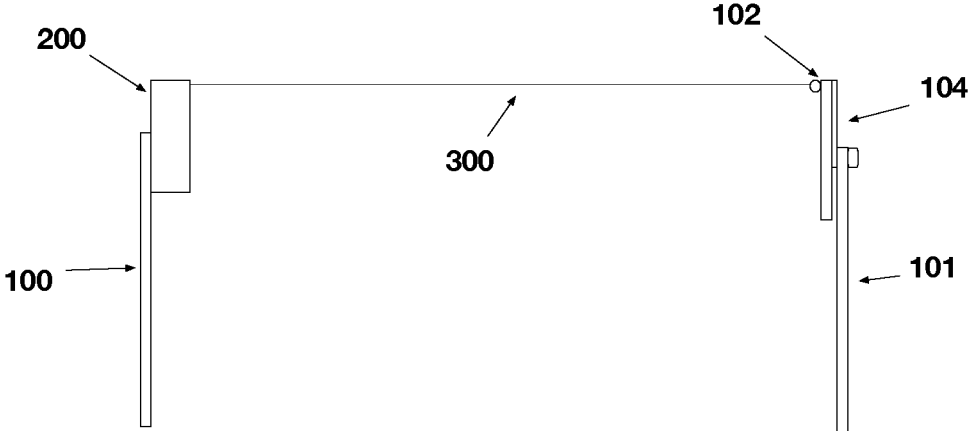
FIG. 17 depicts the elevation view of a third embodiment of the invention, where the Opposing Rotating Crossmember is elevated on an electrically powered extension mechanism that is attached to both the Opposing Rotating Crossmember and the Opposing Fixed Post or Opposing Variable Post.
Figure 18:
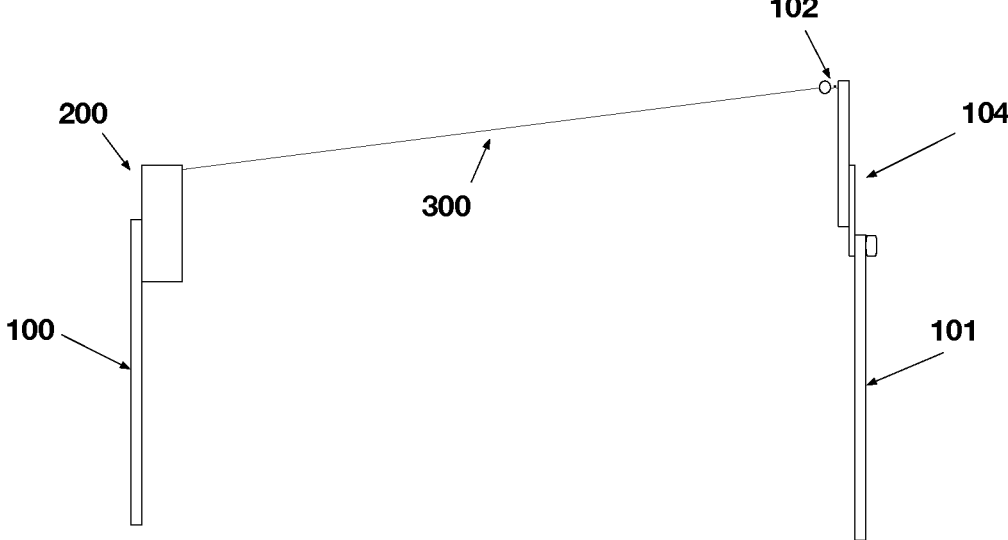
FIG. 18 depicts the elevation view of the third embodiment of the invention, where it shows the Opposing Rotating Crossmember extended by virtue of the Variable Height Opposing Post mechanism, thereby providing the Solar Array an adjustment required for the seasonal solar azimuth.

As shown in FIG. 18, the Opposing Rotating Crossmember (102) can be raised by a Variable Height Opposing Post (104) such that the radiation lower horizon angle of the sun in the winter, for example, can be more effectively captured. This raising of the Variable Height Opposing Post (104) in the example of FIG. 18 is done very slowly, on a daily or bi-weekly basis, in correspondence to the continuous azimuth change of the solar arc. The daily east-west tilt rotation continues to track the solar elevation as described above, resulting in a flat elevation during the summer solar peak as shown in FIG. 17.

Conversely, the post elevation shift can be reversed, with a Variable Height Main Post (103) is lifting the entire array in the same manner.

The Solar Panel Protective Container (200) and its complementary Opposing Rotating Crossmember (102) may be mounted atop a variety of elevation systems and methods, and the Main Fixed Post (100) and Opposing Fixed Post (101), and Variable Height Main Post (103) and Variable Height Opposing Post (104) are just two of many instances or configurations of this invention.

Figure 19:
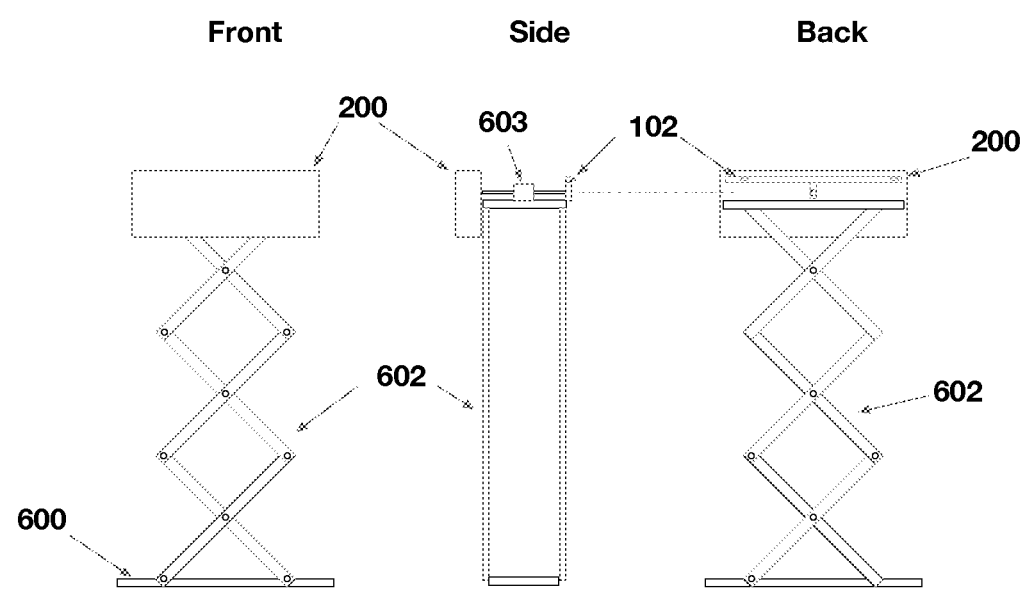
FIG. 19 depicts a fourth embodiment of the invention where the Solar Panel Protective Container is affixed to a standard variable lift mechanism, which may take many different forms, of which only one is depicted here. The Solar Panel Protective Contain is arrange as a combination arrangement on the same tilting axis with an Opposing Rotating Crossmember.
Figure 20:
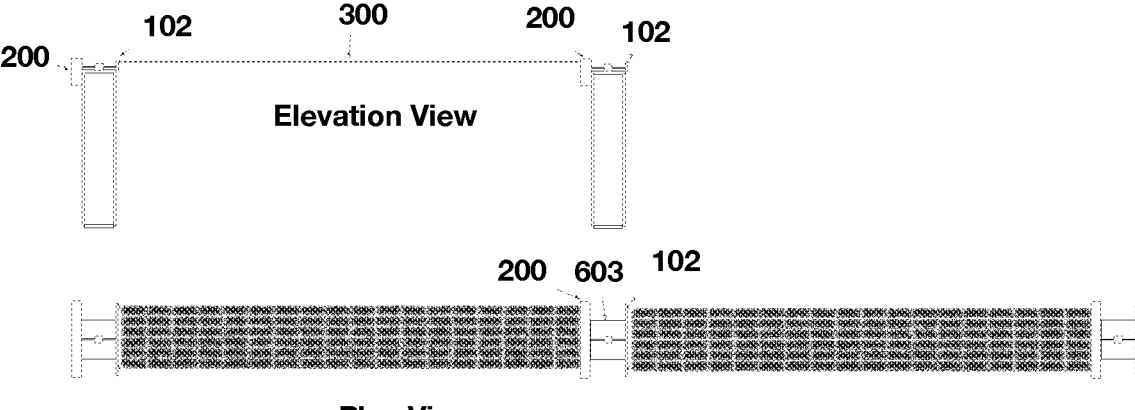
FIG. 20 depicts the fourth embodiment of the invention where the multiple variable combined post structures are daisy-chained to provide large solar exposure surface areas that operate in a single axis tracking arrangement.

In one embodiment in the form of the Variable Height Combined Post (106), both the Solar Panel Protective Container (200) and the Opposing Rotating Crossmember are arranged on a common Rotating Suspension Shaft (203) as shown in FIG. 19, where the assembly is set atop a common scissor lift, and many other methods for variable elevation may be used. This arrangement provides precise altitude adjustment of an unstowed Solar Array set in an end-to-end arrangement, as shown in FIG. 20.

Figure 21:
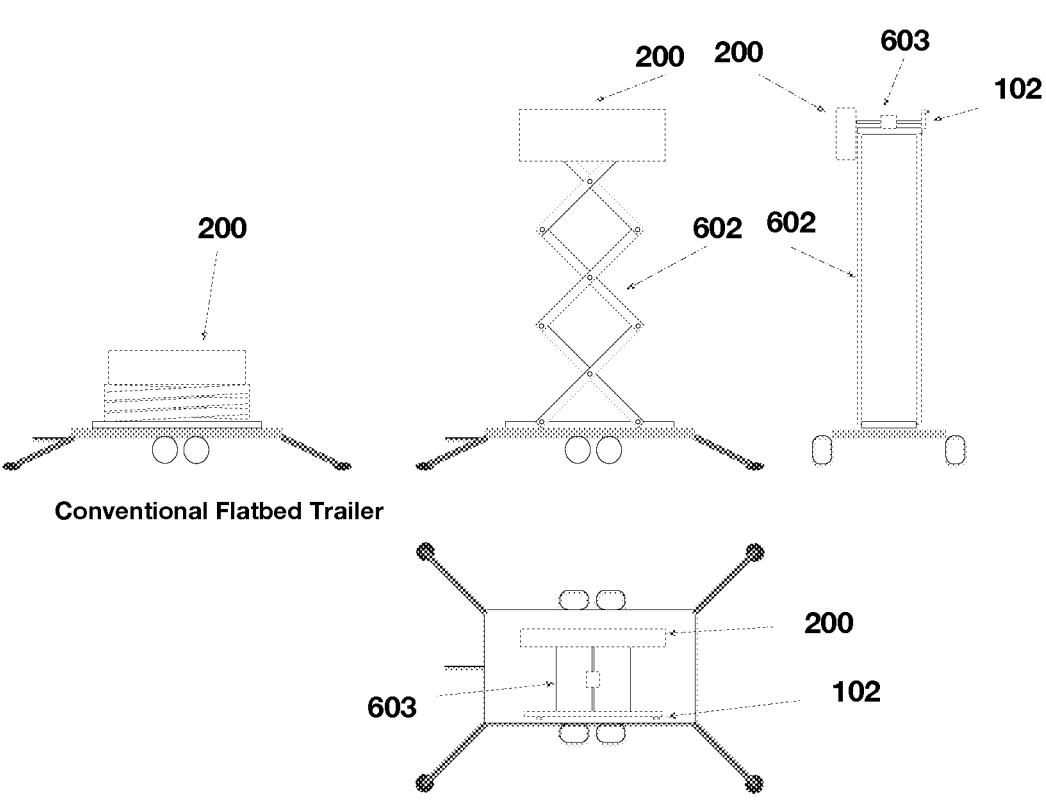
FIG. 21 depicts the fourth embodiment from FIG. 6 that is mounted on a vehicle, which may take several forms.

In another embodiment, the Variable Height Combined Post (106) may be set in its entirety atop a mobile platform in its entirety, shown in FIG. 21, the mobile platform shown as a trailer as merely one example of such a platform. Since the Solar Panel Protective Container (200) contains the entire Solar Array and all associated electrical systems to produce useful electricity, this embodiment provides the user with substantial electricity production potential at any place the mobile platform can be taken.

Further, it should be noted that the present invention exhibits at least one structure, referenced as a first structure, which is attached to the container. There is at least one physical connection disposed between (and connecting) the first structure to a second structure. The at least one solar array is disposed from the at least one physical connection. The at least one physical connection may be a tensioned cable or similar device, and the first structure and/or second structure are preferably variable in height.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

| Glossary of Terms and Definitions | | |
| --- | --- | --- |
| Number | Term | Description |
| 100 | Main Fixed Post | An elevation structure that holds the Solar Panel Protective Container at a fixed height. |
| 101 | Opposing Fixed Post | An elevation structure that holds the Opposing Rotating Crossmember at a fixed height. |
| 102 | Opposing Rotating Crossmember | The structure in opposite to the Solar Panel Protective Container that provides a point of attachment for the Tensioned Suspension Cable and the Electrical Cable Suspension. |
| 103 | Variable Height Main Post | An elevation structure that holds the Solar Panel Protective Container at a variable height. |
| 104 | Variable Height Opposing Post | An elevation structure to which the Rotating Crossmember is attached which may be raised or lowered to a determined height. |
| 105 | Fixed Combined Post | An elevation structure that that holds both the Solar Panel Protective Container and the Opposing Rotating Crossmember in a back-to-back arrangement at a fixed height. |
| 106 | Variable Height Combined Post | An elevation structure that that holds both the Solar Panel Protective Container and the Opposing Rotating Crossmember in a back-to-back arrangement at a variable height. |
| 200 | Solar Panel Protective Container | An assembly of Container Frame and Structural Elements that contains a compressed, rolled, or folded Solar Array and its associated electrical and controls equipment, and that is sheathed in a protective shell. The entire Solar Panel Protective Container is suspended on a single tilting or rotating shaft. |
| 201 | Solar Panel Protective Container Door | A reinforced panel that opens or closes, affording ingress or egress to the inside of the Solar Panel Protective Container. The door may be hinged on all four sides of the opening or may use a rollup or rolldown slats structure. |
| 202 | Container Door Actuator | An actuator device that extends or reduces in length with an electrical command. By attaching this Actuator on one side to the Solar Panel Protective Container and the other end to the Solar Panel Protective Container Door, it may be opened or closed as required with a command. |
| 203 | Rotating Suspension Shaft | A rotating shaft structure on which either the Solar Panel Protective Container or Opposing Rotating Crossmember is attached and suspended, and which rotates the structure when turned. The Rotating Suspension Shaft includes various fixtures, sensors, and motors to effect rotation and measure and digitally report such rotation to a control computer. The Rotating Suspension Shaft allows the entire system to track the sun. |
| 204 | Container Frame and Structural Elements | The Solar Panel Protective Container uses structural elements made of suitable high tensile strength materials to provide protection and rigidity such that is may resist strong winds and flying debris. The structural elements may use beam and other reinforcing components made out of high strength materials. The container frame is covered with a highly impact resistance shell. |
| 205 | Container Shell | The Solar Panel Protective Container is encased in an impact resistive shell and shell frame that protects the contents of the container from flying debris impact from storms or impact from hail. |
| 206 | Container Controls | The container controls system is the switches and computing devices that control the motors and facilitate electrical performance of the invention. |
| 220 | Tensioned Suspension Cable | A high strength cable loop, typically made of steel, but may also be made of carbon fiber, that is at a constant tension, and connected on one end to the Solar Panel Protective Container and the other end to the Rotating Crossmember. The attachment mechanism at one or both ends is a motor powered pulley that turns the Tensioned Suspension Cable in one direction or another by turning on the motor. |

-continued

| | Glossary of Terms and Definitions | |
|---|---|---|
| Number | Term | Description |
| 221 | Electrical Cable Suspension | A high strength cable loop, typically made of steel, but may also be made of carbon fiber, that is at a constant tension and is used to suspend and collect the Direct Current or Alternative Current Electrical Cable, but may be fixed in position and not move or change. |
| 222 | Direct Current or Alternative Current Electrical Cable | One or more cables that carry the electricity generated by the Solar Array to the system electrical switches or Electrical Inverter. In the case of Direct Current only, electrical cables are collected from each panel and bundled together. In the case of Alternating Current, the output cables from microinverters are collected and bundled together. |
| 223 | Electrical Inverter | A device that converts Direct Current (DC) to Alternating Current (AC) such that the energy may be injected into the local electrical grid, which necessarily operates with Alternating Current (AC). An Electrical Inverter may be small (a so-called microinverter) which converts a few solar panels, or large, which can convert all of the Direct Current generated by the entire Solar Array. |
| 230 | Suspension Cable Drive Motor System | A system of motors and pulleys that are able to move the Tensioned Suspension Cable in one direction or the opposite direction on command, thereby effecting the exposure or stowage of the Solar Array. |
| 300 | Solar Array | A structure that consists of solar cells or other photosensitive material arranged as surfaces or individual panels in a rolled or flat arrangement, that can be suspended in the air by a variety of mechanisms, and that is stowable for protection or mobility, and that is deployable to expose a large surface area to the sun for the purposes of producing electrical energy. |
| 301 | Solar Membrane or Foil | A large flexible surface area with one or more flexible photosensitive materials that produce an electrical current when exposed to the sun. This membrane may consist of discrete, flexible cells, or may be a continuous foil material. |
| 302 | Solar Array Panel Hinges | One or more freely moving, tension-biased hinges that connect limited flexibility solar cell panels to one another. |
| 303 | Solar Array Suspension Rings | In the z-fold embodiment of the Solar Array, every other row of Solar Array Panel Hinges are hung from the Tensioned Suspension Cable with rings so that they may move freely over the Tensioned Suspension Cable as the Solar Array is folded or unfolded (FIG. 13 and other figures showing the z-fold solar array embodiment). |
| 304 | Solar Array Leading Edge | The leading edge of the Solar Array in all embodiments is fixed attached to the Tensioned Suspension Cable such that it pulls out the Solar Array when propagated forward and pushes the Solar Array into the Solar Protective Container when propagated backward by the motors in the Suspension Cable Drive Motor System. |
| 310 | Solar Membrane or Foil Rollup Drum | A rotating drum onto which the Solar Membrane or Foil is layered for storage in the Solar Panel Protective Container. |
| 601 | Mobile Mounting Platform Assembly | A motorized or towable platform on which a Variable Height Lifting Mechanism may be mounted. |
| 602 | Variable Height Lifting Mechanism | A system that uses the Variable Height Combined Post to extend or retract the Solar Panel Protective Container or the Opposing Rotating Crossmember or both. |

We claim:

1. A solar array suspension apparatus, comprising:

a freestanding first structure configured to be deployed from a container;

a freestanding second structure configured to be deployed from said container;

wherein said first structure and said second structure have variable heights;

a solar array configured to be deployed between said first structure and said second structure;

at least one suspension cable, said at least one suspension cable fully supporting a weight of said solar array when said solar array is deployed and extended between said first structure and said second structure; and wherein said solar array is configured to be moved via said first structure and said second structure.

2. The solar array suspension apparatus of claim 1, further comprising:

a suspension cable drive motor system, said suspension cable drive motor system disposed in communication with said at least one suspension cable;

wherein said suspension cable drive motor system facilitates the extension and retraction of the solar array along the at least one suspension cable; and wherein said at least one suspension cable fully supports said solar array during extension and retraction.

3. The solar array suspension apparatus of claim 2, further comprising:

a rotating suspension shaft, said rotating suspension shaft disposed in communication with said container;

sensors, said sensors disposed in communication with said rotating suspension shaft;

wherein said sensors are configured to detect a position of the solar array to confirm that the position of the solar array aligns with an angle of the sun with respect to the solar array;

said sensors relaying the positioning data to container controls of the rotating suspension shaft; and the rotating suspension shaft rotating to tilt an entirety of the solar array such that the entirety of the solar array always faces the sun while in operation.

4. The solar array suspension apparatus of claim 2, wherein said at least one suspension cable is under tension; and wherein said at least one suspension cable is composed of steel.

5. The solar array suspension apparatus of claim 2, wherein said container is encased in an impact resistive shell configured to protect said container from hail and debris impact.

6. The solar array suspension apparatus of claim 1, further comprising:

a rotating suspension shaft, said rotating suspension shaft disposed in communication with said container;

sensors, said sensors disposed in communication with said rotating suspension shaft;

wherein said sensors are configured to detect a position of said rotating suspension shaft, providing positioning data;

said sensors relaying the positioning data to container controls of the rotating suspension shaft;

the rotating suspension shaft rotating to tilt an entirety of the solar array such that the entirety of the solar array faces the sun in accordance with known sun position tables over time, thereby maximizing solar energy collection and conversion; and the sensors confirming that the position of the entirety of the solar array is in accordance with the known sun position tables after rotation of the rotating suspension shaft.

7. The solar array suspension apparatus of claim 1, wherein said at least one suspension cable is under tension.

8. The solar array suspension apparatus of claim 1, wherein said at least one suspension cable is composed of steel.

9. The solar array suspension apparatus of claim 1, wherein said container is encased in an impact resistive shell configured to protect said container from hail and debris impact.

10. A solar array suspension apparatus, comprising:

a freestanding first structure configured to be deployed from a container;

a freestanding second structure configured to be deployed from said container;

wherein said first structure and said second structure have variable heights;

a solar array configured to be deployed between said first structure and said second structure;

at least one suspension cable, said at least one suspension cable fully supporting a weight of said solar array when said solar array is deployed and extended between said first structure and said second structure;

wherein said solar array is configured to be moved via said first structure and said second structure;

a suspension cable drive motor system, said suspension cable drive motor system disposed in communication with said at least one suspension cable;

wherein said suspension cable drive motor system facilitates the extension and retraction of the solar array along the at least one suspension cable;

wherein said at least one suspension cable fully supports said solar array during extension and retraction;

a rotating suspension shaft, said rotating suspension shaft disposed in communication with said container;

sensors, said sensors disposed in communication with said rotating suspension shaft;

wherein said sensors are configured to detect a position of said rotation suspension shaft to verify a position of said solar array, generating positioning data;

said sensors relaying the positioning data to container controls of the rotating suspension shaft; and the rotating suspension shaft rotating to tilt an entirety of the solar array such that the entirety of the solar array faces the sun as informed by the known sun position tables.

* * * * *